United States Patent
Kim et al.

(10) Patent No.: US 8,597,147 B2
(45) Date of Patent: Dec. 3, 2013

(54) POWER TRANSMISSION SYSTEM OF HYBRID ELECTRIC VEHICLE

(75) Inventors: Baekyu Kim, Suwon-si (KR); Jang Mi Lee, Tongyeong-si (KR); Sungik Bae, Suwon-si (KR); Yeonho Kim, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/309,092

(22) Filed: Dec. 1, 2011

(65) Prior Publication Data
US 2012/0316021 A1    Dec. 13, 2012

(30) Foreign Application Priority Data
Jun. 9, 2011 (KR) .................... 10-2011-0055688

(51) Int. Cl.
*F16H 57/10* (2006.01)
*F16H 3/58* (2006.01)

(52) U.S. Cl.
USPC ............................... 475/5; 475/271; 475/286

(58) Field of Classification Search
None
See application file for complete search history.

(56) References Cited

U.S. PATENT DOCUMENTS

| | | | | |
|---|---|---|---|---|
| 7,288,041 | B2* | 10/2007 | Bucknor et al. | 475/151 |
| 8,303,447 | B1* | 11/2012 | Kim et al. | 475/5 |
| 2006/0111213 | A1 | 5/2006 | Bucknor et al. | |
| 2006/0240928 | A1 | 10/2006 | Raghavan et al. | |
| 2007/0197335 | A1 | 8/2007 | Raghavan et al. | |
| 2009/0093330 | A1* | 4/2009 | Kumazaki et al. | 475/5 |
| 2010/0227723 | A1* | 9/2010 | Seo et al. | 475/5 |
| 2011/0053724 | A1 | 3/2011 | Phillips | |
| 2012/0052999 | A1 | 3/2012 | Kim et al. | |

FOREIGN PATENT DOCUMENTS

| | | |
|---|---|---|
| JP | 4007403 B1 | 9/2007 |
| JP | 4102423 B2 | 3/2008 |
| JP | 2009-190455 A | 8/2009 |
| KR | 10-2010-0101306 A | 9/2010 |
| KR | 10-2011-0006907 A | 1/2011 |
| KR | 10-2011-0062140 A | 6/2011 |

* cited by examiner

*Primary Examiner* — Justin Holmes
*Assistant Examiner* — Steven B Christ
(74) *Attorney, Agent, or Firm* — Morgan, Lewis & Bockius LLP (57) ABSTRACT

A power transmission system of a hybrid electric vehicle includes an input shaft, a first planetary gear set having first, second, and third rotation elements, the second directly connected to the input shaft, and the third directly connected to a first motor/generator, a second planetary gear set having fourth, fifth, and sixth rotation elements, the fourth directly connected to the first rotation element and a second motor/generator, and the fifth selectively connected to the second rotation element, an output gear connected to the sixth rotation element, a first clutch selectively connecting the second rotation element with the fifth rotation element, a second clutch selectively connecting two rotation elements among the rotation elements of the first planetary gear set, a first brake interposed between the fifth rotation element and a transmission housing, and a second brake interposed between the third rotation element and the transmission housing.

8 Claims, 9 Drawing Sheets

| Mode | | CL1 | CL2 | BK1 | BK2 |
|---|---|---|---|---|---|
| Ev1 | | | | ON | |
| Ev2 | | ON | | ON | |
| Torque Split Mode | Input Split | | | ON | |
| | Compound Split | ON | | | |
| Fixed Shift -speed Mode | Fixed First Speed | | ON | ON | |
| | Fixed Second Speed | ON | ON | | |
| | Fixed Third Speed | ON | | | ON |

POWER TRANSMISSION SYSTEM OF HYBRID ELECTRIC VEHICLE

CROSS-REFERENCE TO RELATED APPLICATION

The present application claims priority of Korean Patent Application Number 10-2011-0055688 filed in the Korean Intellectual Property Office on Jun. 9, 2011, the entire contents of which application are incorporated herein for all purposes by this reference.

BACKGROUND OF INVENTION

1. Field of Invention

The present invention relates to a power transmission system of a hybrid electric vehicle. More particularly, the present invention relates to a power transmission system of a hybrid electric vehicle which realizes at least two electric vehicle (EV) modes, at least two torque split modes and at least three fixed shift-speed modes.

2. Description of Related Art

Generally, a hybrid electric vehicle is a vehicle driven by at least two different types of power sources.

Such a hybrid electric vehicle typically includes an engine and a motor/generator. The hybrid electric vehicle uses a motor/generator having relatively better low-speed torque characteristics as a main power source at a low-speed and uses an engine having relatively better high-speed torque characteristics as a main power source at a high-speed.

Since the hybrid electric vehicle stops an operation of an engine using fossil fuel and uses a motor/generator at a low-speed region, fuel consumption may be improved and exhaust gas may be reduced.

The power transmission system of a hybrid electric vehicle is classified into a mono-mode type and a multi-mode type.

A torque delivery apparatus such as clutches and brakes for shift control is not necessary, but fuel consumption is high due to deterioration of efficiency at a high-speed region and an additional torque multiplication device is required for being applied to a large vehicle according to the mono-mode type.

Since the multi-mode type has high efficiency and is able to multiply torque autonomously, the multi-mode type can be applied to a full size vehicle.

Therefore, the multi-mode type instead of the mono-mode type is applied as the power transmission system of a hybrid electric vehicle and is also under continuous investigation.

The power transmission system of the multi-mode type includes a plurality of planetary gear sets, a plurality of motor/generators operated as a motor and/or a generator, a plurality of torque delivery apparatus controlling rotation elements of the planetary gear set, and a battery used as a power source of the motor/generators.

The power transmission system of the multi-mode type has different operating mechanisms depend on connections of the planetary gear sets, the motor/generators, and the torque delivery apparatus.

In addition, the power transmission system of the multi-mode type has different features such as durability, power delivery efficiency, and size depending on the connections of the planetary gear sets, the motor/generators, and the torque delivery apparatus. Therefore, designs for the connection structure of the power transmission system of a hybrid electric vehicle are also under continuous investigation.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention are directed to provide a power transmission system of a hybrid electric vehicle having advantages of realizing at least two electric vehicle (EV) modes, at least two torque split modes including an input split mode and a compound split mode and at least three fixed shift-speed modes by using at least one of torque delivery apparatus.

Exemplary power transmission systems of a hybrid electric vehicle according to various aspects of the present invention may include: an input shaft adapted to receive torque of an engine; a first planetary gear set having first, second, and third rotation elements, wherein the second rotation element is directly connected to the input shaft, and the third rotation element is directly connected to a first motor/generator; a second planetary gear set having fourth, fifth, and sixth rotation elements, wherein the fourth rotation element is directly connected to the first rotation element of the first planetary gear set and a second motor/generator, and the fifth rotation element is selectively connected to the second rotation element of the first planetary gear set; an output gear connected to the sixth rotation element of the second planetary gear set; a first clutch adapted to selectively connect the second rotation element of the first planetary gear set with the fifth rotation element of the second planetary gear set; a second clutch adapted to selectively connect two rotation elements among the rotation elements of the first planetary gear set; a first brake interposed between the fifth rotation element of the second planetary gear set and a transmission housing; and a second brake interposed between the third rotation element of the first planetary gear set and the transmission housing.

The first planetary gear set may be a single pinion planetary gear set having a first sun gear, a first planet carrier, and a first ring gear as the rotation elements thereof, wherein the first sun gear is selectively connected to the first planet carrier through the second clutch and is directly connected to the fourth rotation element of the second planetary gear set, the first planet carrier is directly connected to the input shaft and is selectively connected to the fifth rotation element of the second planetary gear set, and the first ring gear is connected to the first motor/generator and is selectively connected to the transmission housing through the second brake.

The second planetary gear set may be a double pinion planetary gear set having a second sun gear, a second planet carrier, and a second ring gear as the rotation elements thereof, wherein the second sun gear is directly connected to the first sun gear of the first planetary gear set and is connected to the second motor/generator, the second planet carrier is selectively connected to the first planet carrier of the first planetary gear set through the first clutch and is selectively connected to the transmission housing through the first brake, and the second ring gear is connected to the output gear.

A power transmission system of a hybrid electric vehicle according to other aspects of the present invention may include: a first planetary gear set having a first sun gear, a first planet carrier, and a first ring gear as rotation elements thereof; a second planetary gear set having a second sun gear, a second planet carrier, and a second ring gear as rotation elements thereof; first and second motor/generators adapted to be operated as a motor or a generator; a torque delivery apparatus including first and second clutches and first and second brakes, wherein the first sun gear is directly connected to the second sun gear, the first planet carrier is directly connected to an input shaft and is selectively connected to the first sun gear by interposing the second clutch therebetween, the first ring gear is connected to the first motor/generator and is selectively connected to a transmission housing through the second brake, the second sun gear is connected to the second motor/generator, the second planet carrier is selectively connected to the first planet carrier by interposing the first clutch therebetween and is selectively connected to the transmission housing through the first brake, and the second ring gear is connected to an output gear.

The first planetary gear set may be a single pinion planetary gear set and the second planetary gear set may be a double pinion planetary gear set.

The first brake may be operated at an EV1 mode, the first clutch and the first brake may be operated at an EV2 mode, the first brake may be operated at an input split mode, the first clutch may be operated at a compound split mode, the second clutch and the first brake may be operated at a fixed first speed mode, the first clutch and the second clutch may be operated at a fixed second speed mode, and the first clutch and the second brake may be operated at a fixed third speed mode.

The power transmission system may further include a battery as a power source for the motors/generators.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the various embodiments will be omitted, and the same constituent elements are denoted by the same reference numerals in this specification.

In the detailed description, ordinal numbers are used for distinguishing constituent elements having the same terms, and have no specific meanings or orders.

Figure 1:
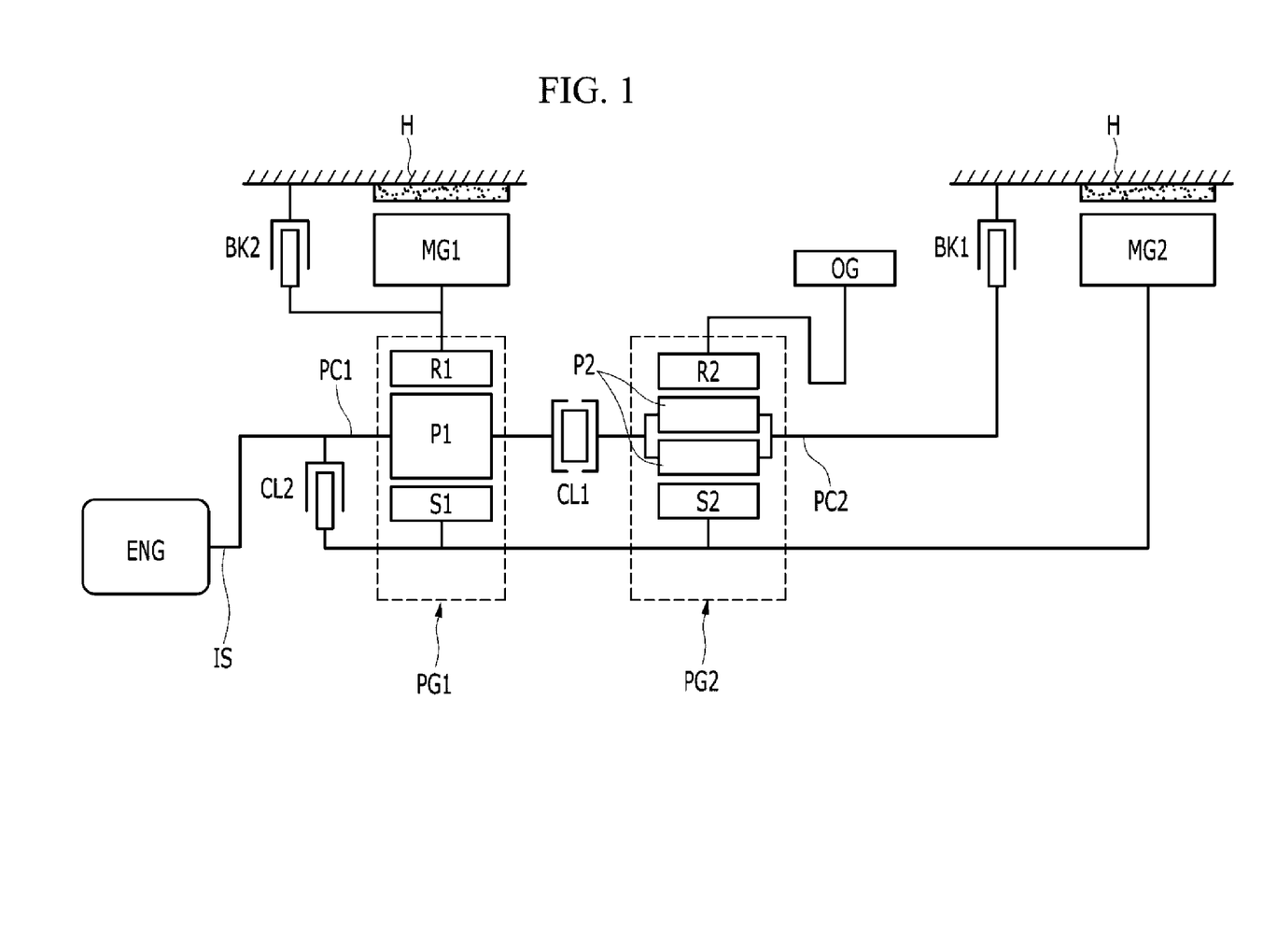
FIG. 1 is a schematic diagram of an exemplary power transmission system according to various aspects of the present invention.

Referring to FIG. 1, a power transmission system of a hybrid electric vehicle according to various embodiments of the present invention receives torque of an engine ENG that is a power source through an input shaft IS, changes the torque according to a running state of a vehicle, and outputs the changed torque through an output gear OG.

The power transmission system includes first and second planetary gear sets PG1 and PG2, first and second motor/generators MG1 and MG2, and a torque delivery apparatus consisting of first and second clutches CL1 and CL2 and first and second brakes BK1 and BK2.

A rotation element of the first planetary gear set PG1 is directly connected to a rotation element of the second planetary gear set PG2, and another rotation element of the first planetary gear set PG1 is selectively connected to another rotation element of the second planetary gear set PG2 such that the first planetary gear set PG1 and the second planetary gear set PG2 operate as one compound planetary gear set.

The first motor/generator MG1 and the second motor/generator MG2 are independent power sources, and are operates as a motor and/or a generator in an otherwise conventional manner.

The first motor/generator MG1 is operated as a motor supplying torque to the other rotation element of the first planetary gear set PG1 by being connected thereto, or is operated as a generator generating electricity by being rotated by torque of the other rotation element.

The second motor/generator MG2 is operated as a motor supplying torque to the rotation element of the second planetary gear set PG2 directly connected to the rotation element of the first planetary gear set PG1, or is operated as a generator generating electricity by being rotated by torque of the rotation element.

For this purpose, the first motor/generator MG1 and the second motor/generator MG2 have stators fixed to a transmission housing H and rotors connected to the other rotation element of the first planetary gear set PG1 and the rotation element of the second planetary gear set PG2, respectively.

The first clutch CL1 selectively connects another rotation element of the first planetary gear set PG1 with another rotation element of the second planetary gear set PG2, and the second clutch CL2 selectively connects two rotation elements among three rotation elements of the first planetary gear set PG1.

In addition, the first brake BK1 selectively connects another rotation element of the second planetary gear set PG2 with a transmission housing H, and the second brake BK2 is disposed in parallel with the first motor/generator MG1 and selectively connects the other rotation element of the first planetary gear set PG1 with the transmission housing H.

The first and second planetary gear sets PG1 and PG2 and the first and second motor/generators MG1 and MG2 are disposed on the same axis.

In various embodiments, the torque delivery apparatus comprising of the first and second clutches CL1 and CL2 and the first and second brakes BK1 and BK2 are conventional multi-plate friction elements of wet type that are operated by hydraulic pressure.

Herein, a clutch is a friction member which connects a rotation member with another rotation member, a brake is a friction member which connects a rotation member with a non-rotation member. However, one will appreciate that the present invention is not limited to the friction elements of wet type, or friction types. Other appropriate types of clutches and brakes can be used.

Constituent elements of a power transmission system according to various embodiments of the present invention will be described in detail.

The first planetary gear set PG1 is a single pinion planetary gear set, and includes a first sun gear S1, a first planet carrier PC1 rotatably supporting a first pinion P1 externally engaged with the first sun gear S1, and a first ring gear R1 internally engaged with the first pinion P1 as rotation elements thereof.

The second planetary gear set PG2 is a double pinion planetary gear set, and includes a second sun gear S2, a second planet carrier PC2 rotatably supporting a second pinion P2 externally engaged with the second sun gear S2, and a second ring gear R2 internally engaged with the second pinion P2 as rotation elements thereof.

The first sun gear S1 is directly connected to the second sun gear S2, the first planet carrier PC1 is selectively connected to the second planet carrier PC2, the first planet carrier PC1 is connected to the input shaft IS that is an input member, and the second ring gear R2 is connected to the output gear OG that is an output member.

The first motor/generator MG1 is connected to the first ring gear R1 of the first planetary gear set PG1 so as to drive the first ring gear R1 or to be operated as the generator.

The second motor/generator MG2 is connected to the second sun gear S2 of the second planetary gear set PG2 so as to drive the second sun gear S2 or to be operated as the generator.

The first clutch CL1 is disposed between the first planet carrier PC1 of the first planetary gear set PG1 and the second planet carrier PC2 of the second planetary gear set PG2 so as to selectively connect the first and second planet carriers PC1 and PC2.

The second clutch CL2 is disposed between the first sun gear S1 and the first planet carrier PC1 of the first planetary gear set PG1 so as to selectively lock the first planetary gear set PG1. At this case, the first planetary gear set PG1 rotates as one rotation member.

The first brake BK1 is disposed between the second planet carrier PC2 of the second planetary gear set PG2 and the transmission housing H so as to operate the second planet carrier PC2 as a selective fixed element.

The second brake BK2 is disposed in parallel with the first motor/generator MG1 and operates the first ring gear R1 of the first planetary gear set PG1 as a selective fixed element.

Figure 2:
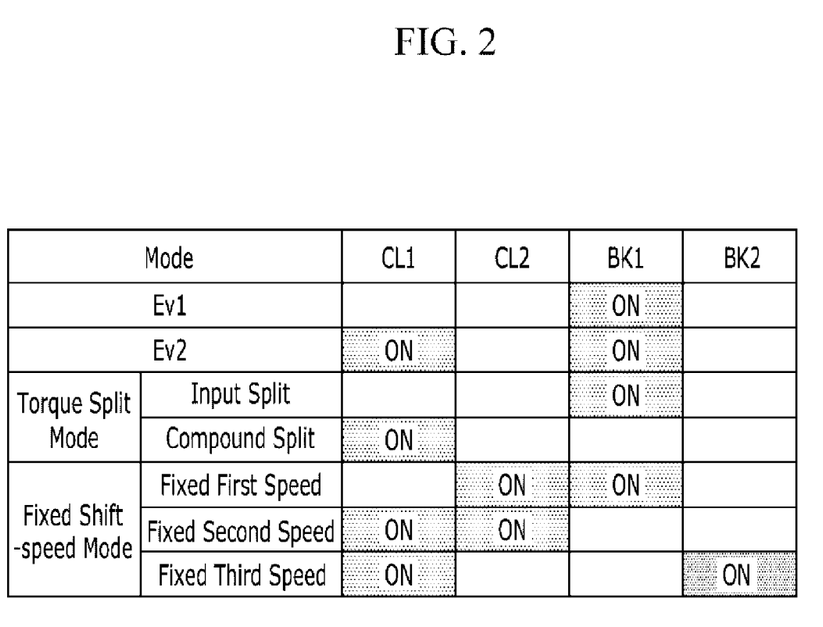
FIG. 2 is an operational chart of a torque delivery apparatus at each operation mode applied to an exemplary power transmission system of the present invention.

FIG. 2 is an operational chart of torque delivery apparatus at each operation mode applied to a power transmission system according to various embodiments of the present invention.

Referring to FIG. 2, torque delivery apparatus operated at each shift-speed will be described detail.

The first brake BK1 is operated at an electric vehicle (EV) EV1 mode. The first clutch CL1 and the first brake BK1 are operated at an EV2 mode. The first brake BK1 is operated at an input split mode. The first clutch CL1 is operated at a compound split mode. The second clutch CL2 and the first brake B1 are operated at a fixed first speed mode. The first clutch CL1 and the second clutch CL2 are operated at a fixed second speed mode. The first clutch CL1 and the second brake BK2 are operated at a fixed third speed mode.

As described above, the power transmission system according to various embodiments of the present invention can realize two EV modes, two torque split modes, and three fixed shift-speed modes.

Figure 3:
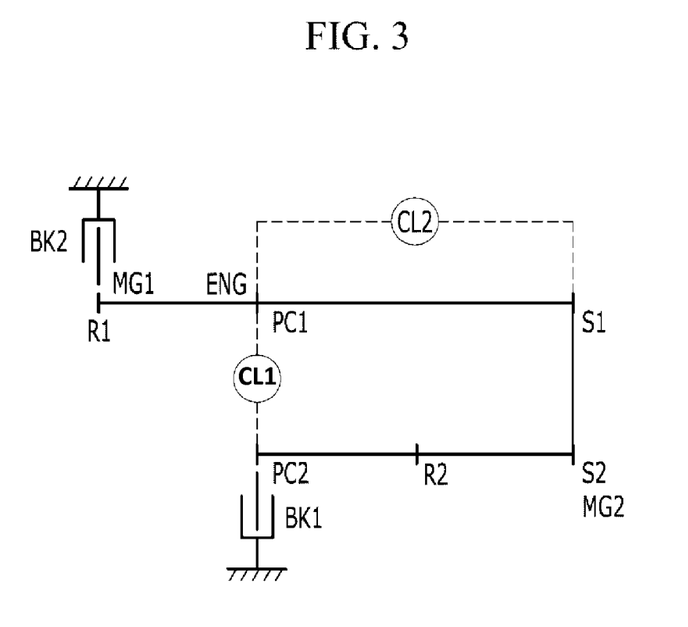
FIG. 3 is a schematic diagram for showing connections between constituent elements of an exemplary power transmission system according to various aspects of the present invention.
Figure 4:
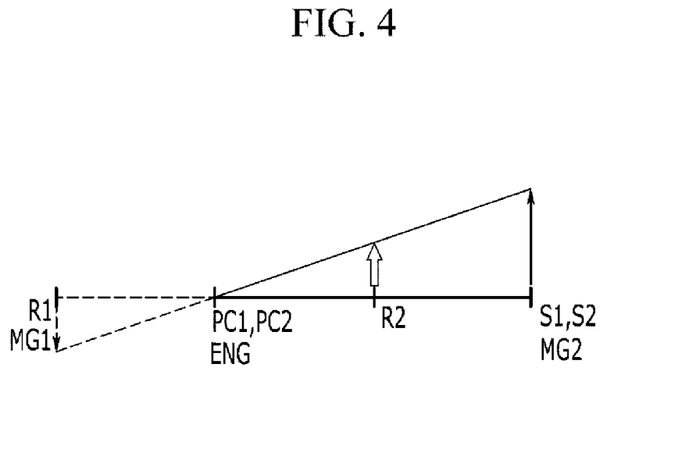
FIG. 4 is a lever diagram for an exemplary power transmission system of the present invention at an electric vehicle (EV) EV1 mode and an input split mode.

FIG. 3 is a schematic diagram for showing connections between constituent elements of the power transmission system according to various embodiments of the present invention, and FIG. 4 is a lever diagram for a power transmission system according to various embodiments of the present invention at an EV1 mode and an input split mode.

Referring to FIG. 3 and FIG. 4, the first brake BK1 is operated at the EV1 mode.

The engine ENG maintains to be stopped, the first planetary gear set PG1 does not affect on the shifting, and the shifting is done by three rotation elements of the second planetary gear set PG2.

That is, in a state that the second motor/generator MG2 operates so as to input torque thereof to the second sun gear S2, the second planet carrier PC2 is operated as a fixed element by operation of the first brake BK1 and a reduced speed is output through the second ring gear R2 that is the output element.

In addition, in a state that torque of the second sun gear S2 is input to the first sun gear S1, the engine ENG is stopped. Therefore, the first planet carrier PC1 is operated as a fixed element and the first motor/generator MG1 rotates inversely.

At this time, if the engine is started by control of the first motor/generator MG1, the input split mode is achieved.

Figure 5:
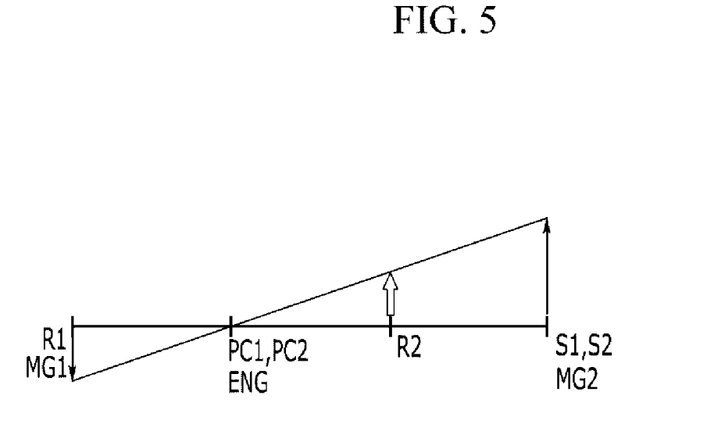
FIG. 5 is a lever diagram for an exemplary power transmission system of the present invention at an EV2 mode.

FIG. 5 is a lever diagram for a power transmission system according to various embodiments of the present invention at an EV2 mode.

Referring to FIG. 3 and FIG. 5, the first clutch CL1 and the first brake BK1 are operated at the EV2 mode.

The first planet carrier PC1 and the second planet carrier PC2 are connected by operation of the first clutch CL1, and the first planetary gear set PG1 and the second planetary gear set PG2 are operated by four rotation elements.

In a state that the second motor/generator MG2 operates and torque of the second motor/generator MG2 is input to the second sun gear S2, the second planet carrier PC2 is operated as a fixed element by operation of the first brake BK1. Therefore, a reduced speed is output through the second ring gear R2 that is the output element. At this time, the first motor/generator MG1 rotates inversely.

Figure 6:
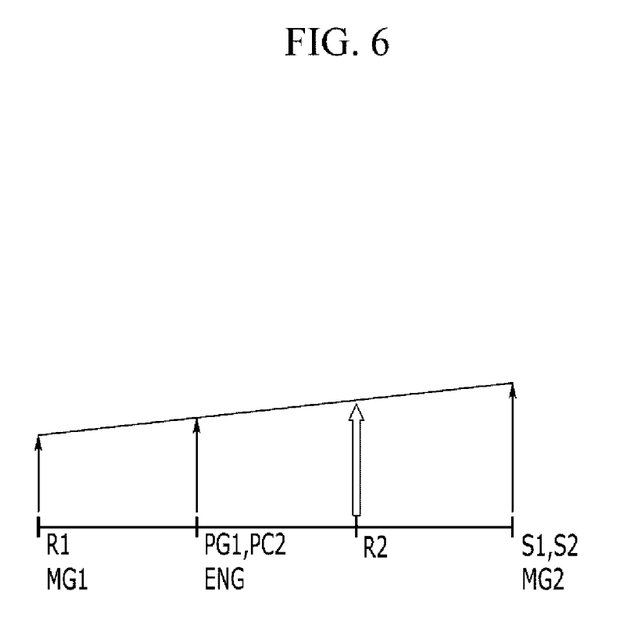
FIG. 6 is a lever diagram for an exemplary power transmission system of the present invention at a compound split mode.

FIG. 6 is a lever diagram for a power transmission system according to various embodiments of the present invention at a compound split mode.

Referring to FIG. 3 and FIG. 6, the first clutch CL1 is operated at the compound split mode. At this state, the first motor/generator MG1 and the second motor/generator MG2 are connected to the engine ENG or the output gear OG through the rotation elements of the planetary gear sets.

Therefore, the engine ENG, the first motor/generator MG1, and/or the second motor/generator MG2 can generate driving torque, and supple torque to the first motor/generator MG1 and/or the second motor/generator MG2 so as to generate electricity, and all the speed ratios required for driving the vehicle can be obtained by changing their speeds suitably.

Figure 7:
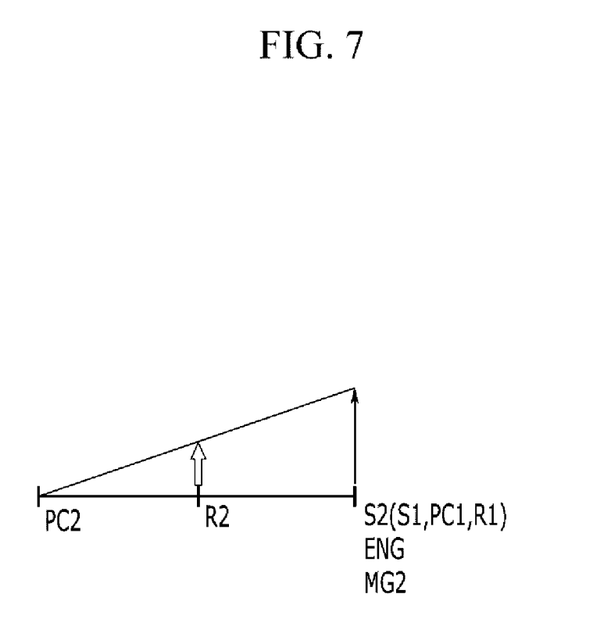
FIG. 7 is a lever diagram for an exemplary power transmission system of the present invention at a fixed first speed mode.

FIG. 7 is a lever diagram for a power transmission system according to various embodiments of the present invention at a fixed first speed mode.

Referring to FIG. 3 and FIG. 7, the second clutch CL2 and the first brake BK1 are operated at the fixed first speed mode.

Since the first planetary gear set PG1 becomes direct-coupling state by operation of the second clutch CL2, three rotation elements of the second planetary gear set PG2 are related to the shifting.

At this state, torque of the engine ENG is input to the second sun gear S2 of the second planetary gear set PG2 through the first planetary gear set PG1, and the second planet carrier PC2 is operated as the fixed element by operation of the first brake B1. Therefore, a reduced speed by a predetermined speed ratio is output and the fixed first speed mode is achieved.

Figure 8:
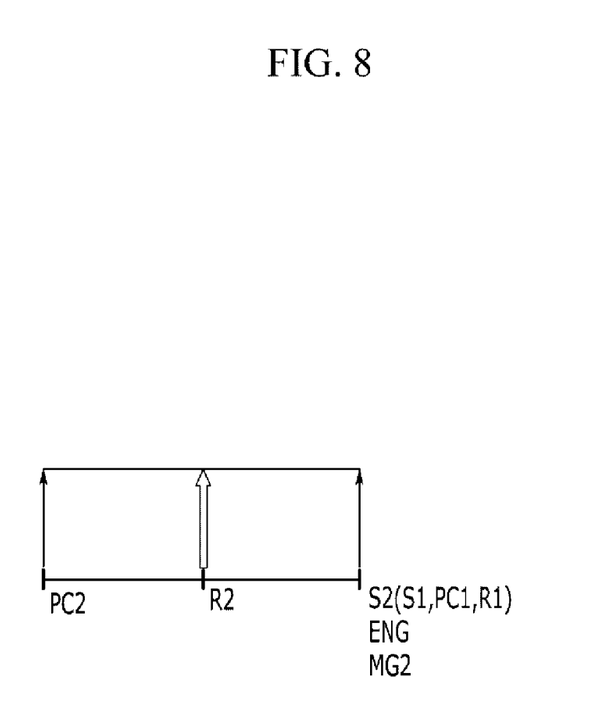
FIG. 8 is a lever diagram for an exemplary power transmission system of the present invention at a fixed second speed mode.

FIG. 8 is a lever diagram for a power transmission system according to various embodiments of the present invention at a fixed second speed mode.

Referring to FIG. 3 and FIG. 8, the first brake BK1 that was operated at the fixed first speed mode is released and the first clutch CL1 is operated at the fixed second speed mode.

Since the first planetary gear set PG1 becomes direct-coupling state by operation of the second clutch CL2, three rotation elements of the second planetary gear set PG2 are related to the shifting.

At this state, torque of the engine ENG is input to the second sun gear S2 and the second planet carrier PC2 of the second planetary gear set PG2 through the first planetary gear set PG1.

Therefore, the second planetary gear set PG2 becomes direct-coupling state and a rotation speed that is the same as a rotation speed of the engine is output and the fixed second speed mode is achieved.

Figure 9:
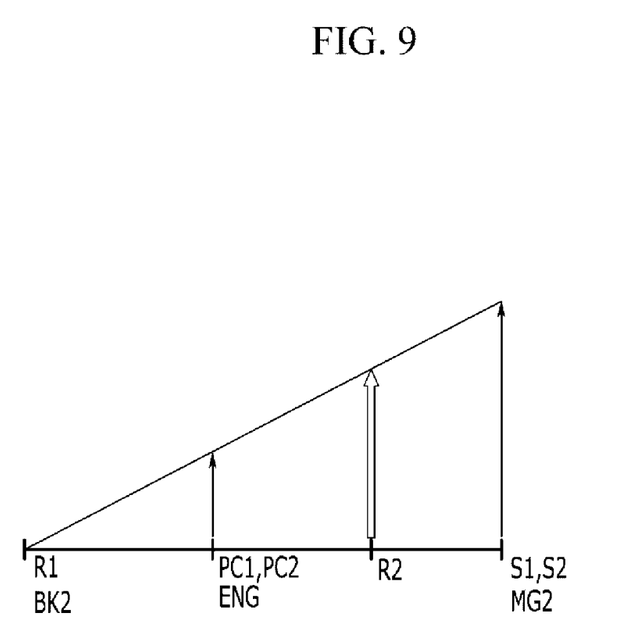
FIG. 9 is a lever diagram for an exemplary power transmission system of the present invention at a fixed third speed mode.

FIG. 9 is a lever diagram for a power transmission system according to various embodiments of the present invention at a fixed third speed mode.

Referring to FIG. 3 and FIG. 9, the second clutch CL2 that was operated at the fixed second speed is released and the second brake BK2 is operated at the fixed third speed mode.

Then, the first planet carrier PC1 and the second planet carrier PC2 are connected by operation of the first clutch CL1 and the first planetary gear set PG1 and the second planetary gear set PG2 are operated by four rotation elements.

At this state, torque of the engine ENG is input to the first and second planet carriers PC1 and PC2, and the first ring gear R1 is operated as the fixed element by operation of the second brake BK2. Therefore, an increased speed by a predetermined speed ratio is output. That is, overdrive mode with a fixed speed ratio is achieved.

Various embodiments of the present invention achieve multi-mode type where fixed speed ratios and variable speed ratios are combined. Therefore, high efficiency may be achieved at all the speed ratios of a vehicle and fuel economy may be improved.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission system of a hybrid electric vehicle, comprising:
   an input shaft adapted to receive a torque of an engine;
   a first planetary gear set having first, second, and third rotation elements, wherein the second rotation element is directly connected to the input shaft, and the third rotation element is directly connected to a first motor/generator;
   a second planetary gear set having fourth, fifth, and sixth rotation elements, wherein the fourth rotation element is directly connected to the first rotation element of the first planetary gear set and directly connected to a second motor/generator, and the fifth rotation element is selectively connected to the second rotation element of the first planetary gear set;
   an output gear directly connected to the sixth rotation element of the second planetary gear set;
   a first clutch adapted to selectively connect the second rotation element of the first planetary gear set with the fifth rotation element of the second planetary gear set;
   a second clutch adapted to selectively connect two rotation elements among the rotation elements of the first planetary gear set;
   a first brake interposed between the fifth rotation element of the second planetary gear set and a transmission housing; and
   a second brake interposed between the third rotation element of the first planetary gear set and the transmission housing.

2. The power transmission system of claim 1, wherein the first planetary gear set is a single pinion planetary gear set having a first sun gear, a first planet carrier, and a first ring gear as the rotation elements thereof, and
   wherein the first sun gear is selectively connected to the first planet carrier through the second clutch and is directly connected to the fourth rotation element of the second planetary gear set,
   the first planet carrier is directly connected to the input shaft and is selectively connected to the fifth rotation element of the second planetary gear set, and
   the first ring gear is connected to the first motor/generator and is selectively connected to the transmission housing through the second brake.

3. The power transmission system of claim 2, wherein the second planetary gear set is a double pinion planetary gear set having a second sun gear, a second planet carrier, and a second ring gear as the rotation elements thereof, and
   wherein the second sun gear is directly connected to the first sun gear of the first planetary gear set and is connected to the second motor/generator,
   the second planet carrier is selectively connected to the first planet carrier of the first planetary gear set through the first clutch and is selectively connected to the transmission housing through the first brake, and
   the second ring gear is connected to the output gear.

4. A power transmission system of a hybrid electric vehicle, comprising:
   a first planetary gear set having a first sun gear, a first planet carrier, and a first ring gear as rotation elements thereof;
   a second planetary gear set having a second sun gear, a second planet carrier, and a second ring gear as rotation elements thereof;
   first and second motors/generators adapted to be operated as a motor or a generator;
   a torque delivery apparatus including first and second clutches and first and second brakes, wherein the first sun gear is directly connected to the second sun gear, wherein the first planet carrier is directly connected to an input shaft and is selectively connected to the first sun gear by interposing the second clutch therebetween, wherein the first ring gear is directly connected to the first motor/generator and is selectively connected to a transmission housing through the second brake, wherein the second sun gear is directly connected to the second motor/generator, wherein the second planet carrier is selectively connected to the first planet carrier by interposing the first clutch therebetween and is selectively connected to the transmission housing through the first brake, and wherein the second ring gear is directly connected to an output gear.

5. The power transmission system of claim 4, wherein the first planetary gear set is a single pinion planetary gear set and the second planetary gear set is a double pinion planetary gear set.

6. The power transmission system of claim 4, wherein the first brake is operated at an electric vehicle (EV) EV1 mode,
the first clutch and the first brake are operated at an EV2 mode,
the first brake is operated at an input split mode,
the first clutch is operated at a compound split mode,
the second clutch and the first brake are operated at a fixed first speed mode,
the first clutch and the second clutch are operated at a fixed second speed mode, and
the first clutch and the second brake are operated at a fixed third speed mode.

7. The power transmission system of claim 1, further comprising a battery as a power source for the motors/generators.

8. The power transmission system of claim 3, wherein the first brake is operated at an electric vehicle EV1 mode,
the first clutch and the first brake are operated at an EV2 mode,
the first brake is operated at an input split mode,
the first clutch is operated at a compound split mode,
the second clutch and the first brake are operated at a fixed first speed mode,
the first clutch and the second clutch are operated at a fixed second speed mode, and
the first clutch and the second brake are operated at a fixed third speed mode.

\* \* \* \* \*